(12) United States Patent
Luo et al.

(10) Patent No.: US 7,869,161 B2
(45) Date of Patent: Jan. 11, 2011

(54) DUAL WRITE GAP PERPENDICULAR RECORDING HEAD WITH A NON-MAGNETIC BACKSIDE SHIELD

(75) Inventors: Peng Luo, Fremont, CA (US); Keung Youn Cho, San Jose, CA (US); Shuyu Sun, Saratoga, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 888 days.

(21) Appl. No.: 11/810,339

(22) Filed: Jun. 4, 2007

(65) Prior Publication Data

US 2008/0297946 A1 Dec. 4, 2008

(51) Int. Cl.
*G11B 5/127* (2006.01)

(52) U.S. Cl. .................................. 360/125.02

(58) Field of Classification Search .................. None
See application file for complete search history.

(56) References Cited

U.S. PATENT DOCUMENTS 5,311,385 A * 5/1994 Schwarz et al. ............. 360/319
7,212,379 B2 * 5/2007 Hsu et al. ............... 360/125.16

* cited by examiner

*Primary Examiner*—David D Davis
(74) *Attorney, Agent, or Firm*—Ben J. Yorks; Irell & Manella LLP

(57) ABSTRACT

A perpendicular recording head for a hard disk drive. The head includes a non-magnetic backside shield that minimizes or eliminates the flow of backside flux through the head. The head can be fabricated by forming a non-magnetic backside shield layer on a main pole. Portions of the backside shield and main pole can be removed to form a tapered pole portion. A non-magnetic write-gap layer and write shield are then formed onto the backside shield and main pole.

6 Claims, 3 Drawing Sheets

DUAL WRITE GAP PERPENDICULAR RECORDING HEAD WITH A NON-MAGNETIC BACKSIDE SHIELD

BACKGROUND OF THE INVENTION

1. Field of the Invention

The present invention relates to perpendicular recording heads used in hard disk drives.

2. Background Information

Hard disk drives contain a plurality of magnetic heads that are coupled to rotating disks. The heads can magnetize and sense the magnetic fields of the disks to write and read data, respectively. The heads each have an air bearing surface that cooperates with a flow of air generated by the rotating disks to create an air bearing. The air bearing prevents mechanical wear between the head and the disk.

The heads magnetize the disk in either a horizontal direction parallel with the disk surface, or a vertical direction perpendicular to the surface of the disk. Vertical recording occupies less surface space and thus allows for increased disk capacity. Heads that record in a vertical direction are commonly referred to as perpendicular recording heads ("PMR").

FIG. 1 illustrates a perpendicular recording head 1 of the prior art. The head 1 includes a main pole 2 and a write shield 3 that are both constructed from magnetic material. The main pole 2 includes a write coil 4. The write coil 4 emanates a magnetic flux 5 when a current flows through the coil 4. The head 1 includes a write-gap layer 6 of non-magnetic material. The write-gap layer 6 induces an outward flow of the magnetic flux 5 into an adjacent disk 7.

To increase the capacity of the disk drive it is desirable to minimize the thickness of the write-gap layer 6. Thin write-gap layers allow backside flux leakage shown by the arrow 8. Backside flux leakage reduces the amount of flux that extends into the disk 7 and reduces the strength of disk magnetization and the resultant read signal. It would be desirable to reduce or eliminate backside flux leakage without significantly varying the fabrication process of the head.

BRIEF SUMMARY OF THE INVENTION

A perpendicular recording head for a hard disk drive that includes a magnetic main pole with a backside portion and a tapered portion. A non-magnetic write-gap layer is located adjacent to the backside and tapered portions of the magnetic main pole. The head further has a non-magnetic backside shield located between the non-magnetic write gap layer and the main pole on the backside portion. A write shield is located adjacent to the non-magnetic write-gap layer.

DETAILED DESCRIPTION

Disclosed is a perpendicular recording head for a hard disk drive. The head includes a non-magnetic backside shield that minimizes or eliminates the flow of backside flux through the head. The head can be fabricated by forming a non-magnetic backside shield layer on a main pole. Portions of the backside shield and main pole can be removed to form a tapered pole portion. A non-magnetic write-gap layer and write shield are then formed onto the backside shield and main pole.

Figure 2:
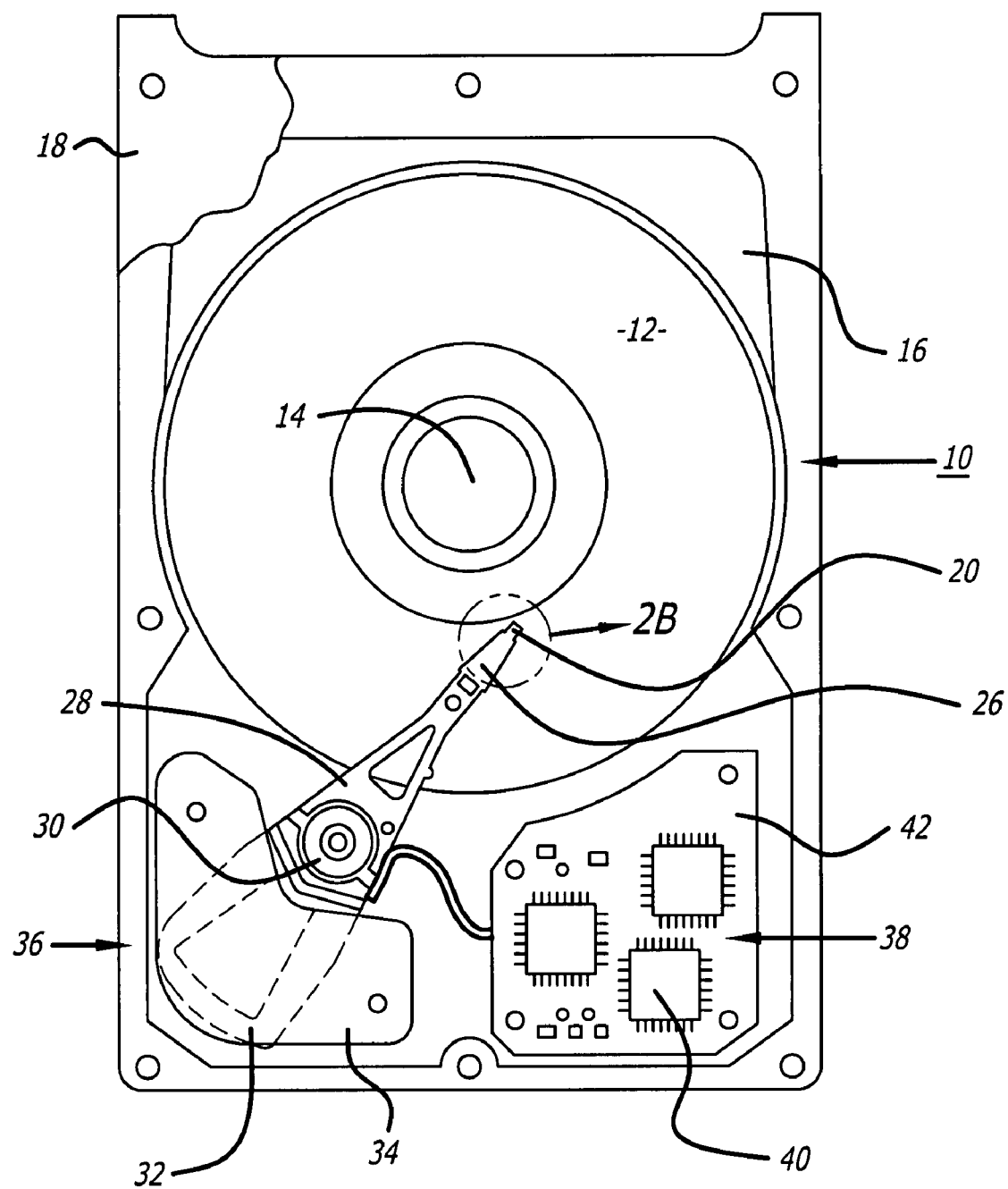
FIG. 2 is a top view of a hard disk drive.

Referring to the drawings more particularly by reference numbers, FIG. 2 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. Each head 20 may have separate write (not shown) and read elements (not shown). The heads 20 are gimbal mounted to a corresponding flexure arm 22. The flexure arms 22 are attached to an actuator arm 24 that is pivotally mounted to the base plate 16 by a bearing assembly 26. A voice coil 32 is attached to the actuator arm 24. The voice coil 32 is coupled to a magnet assembly 34 to create a voice coil motor (VCM) 36. Providing a current to the voice coil 32 will create a torque that swings the actuator arm 24 and moves the heads 20 across the disks 12. The actuator arm 24 and flexure arms 22 can collectively be referred to as an actuator arm assembly.

Figure 1:
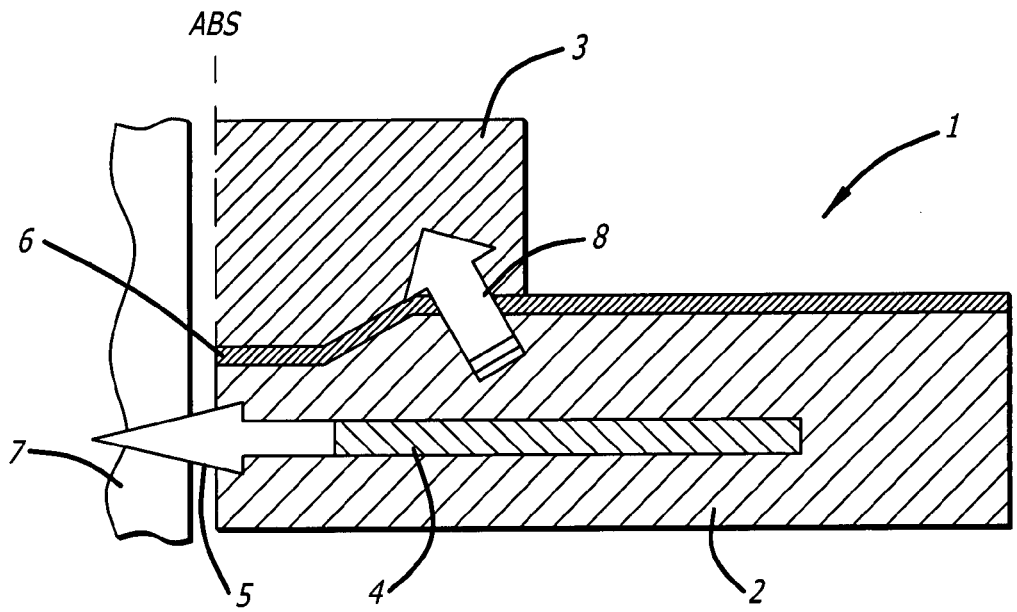
FIG. 1 is an illustration of a perpendicular recording head of the prior art.
Figure 3:
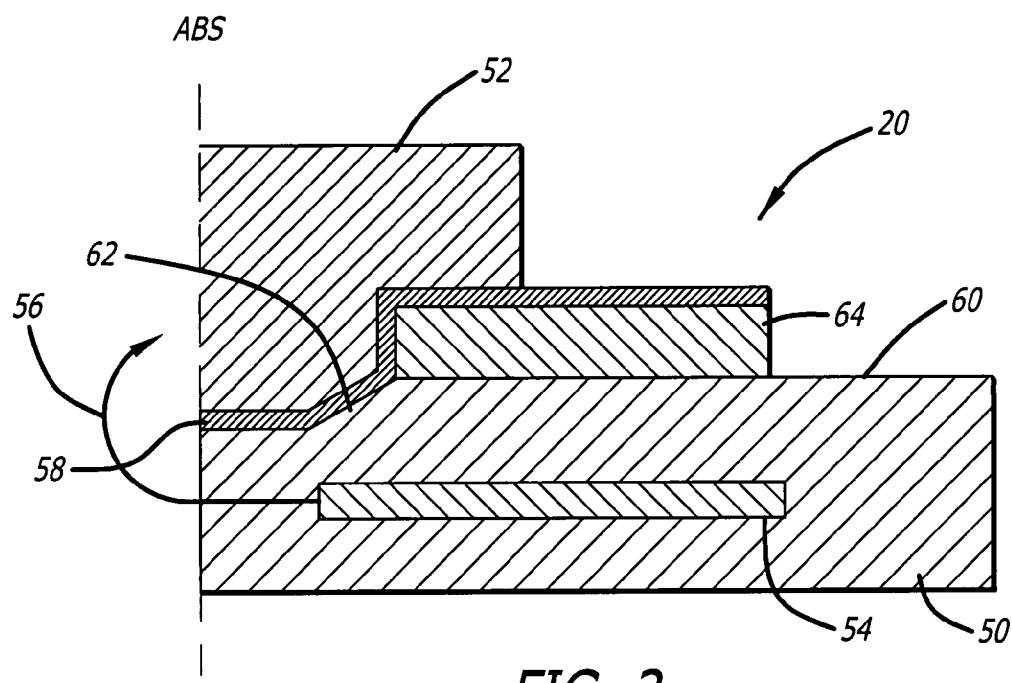
FIG. 3 is an illustration of a perpendicular recording head of the hard disk drive.

The hard disk drive 10 may include a printed circuit board assembly 38 that includes a plurality of integrated circuits 40 coupled to a printed circuit board 42. The printed circuit board 42 is coupled to the voice coil 32, heads 20 and spindle motor 14. The cover 18 and base plate 16 enclose the disk 12 and heads 20 of the disk drive 10. The printed circuit board assembly 38 may include a controller that controls the operation of the disk drive FIG. 3 shows an embodiment of a perpendicular recording head 20. The head 20 includes a main pole 50 and a write shield 52. Both the main pole 50 and write shield 52 are constructed from a magnetic material such as a composition that includes nickel and iron.

The main pole 50 includes a write coil 54. The write coil 54 is connected to electrical circuits (not shown) that can provide a current to the coil 54. As is known in the art, the current will generate a magnetic flux 56 that flows out of the write coil 54.

The head 20 includes a non-magnetic write-gap layer 58. The write-gap 58 can be relatively small, being on the order of approximately 35 nanometers or less. The non-magnetic nature of the write-gap 56 causes the magnetic flux 58 to flow out of the main pole 50 and into the write shield 52 as shown. The main pole 50 has a backside portion 60 and a tapered portion 62. The tapered portion 62 focuses the flux to reduce the area of the disk that is magnetized.

The head 20 further has a non-magnetic backside shield 64. The backside shield 64 reduces or eliminates the backside flow of flux from the write coil 54 to the write shield 52. By way of example, the backside shield 64 may have a thickness no greater than approximately 50 nanometers. The shield 64 is constructed from a non-magnetic material such as aluminum oxide ($Al_2O_3$).

Figure 4A:
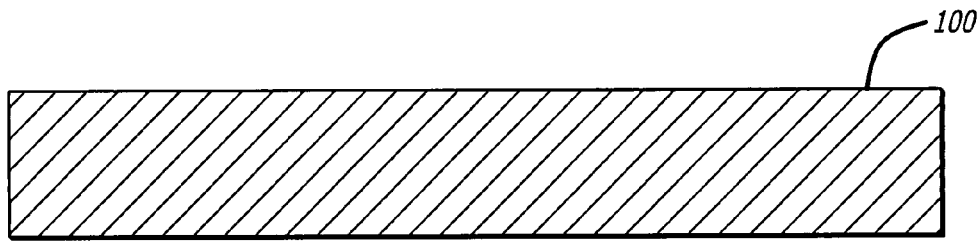
FIGS. 4a-e are illustrations showing a fabrication process for the perpendicular recording head.
Figure 4B:
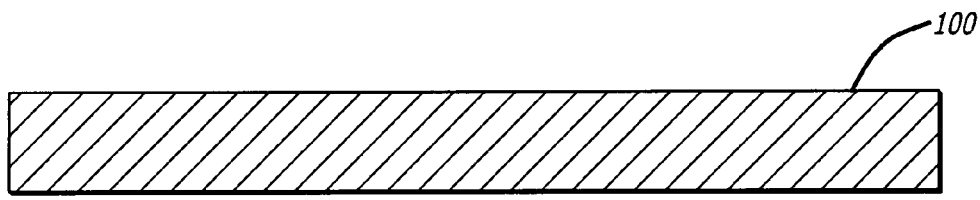

FIGS. 4a-e show a process for fabricating a head 20. A main pole 100 is provided after a series of well known fabrication steps. The main pole 100 undergoes a chemical-mechanical polish ("CMP") process that reduces the thickness of the pole as shown in FIG. 4b.

Figure 4C:
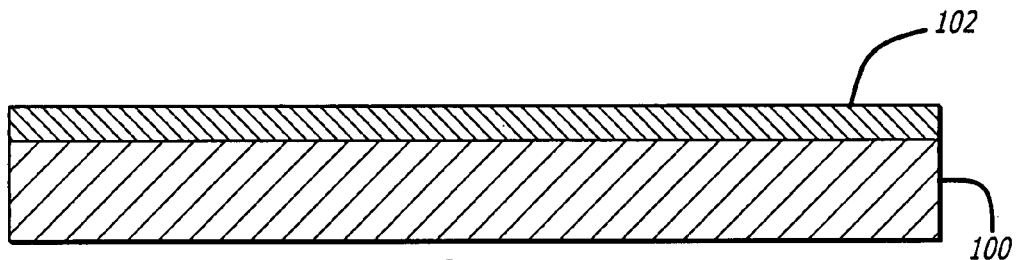
Figure 4D:
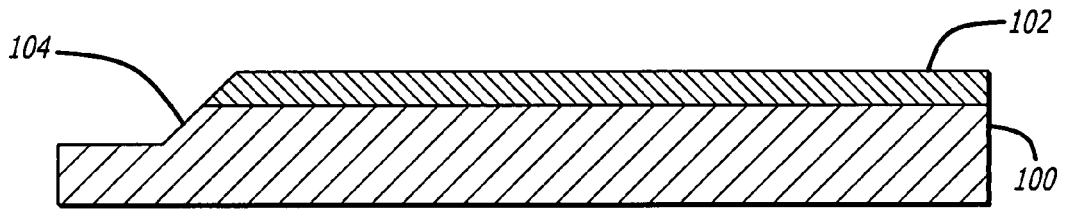

As shown in FIG. 4c a non-magnetic backside shield layer 102 is formed on the polished main pole 100. A portion of the backside shield 102 and main pole 100 are removed to create a tapered portion 104 as shown in FIG. 4d. The backside shield and main pole material can be removed with well known milling techniques.

Figure 4E:
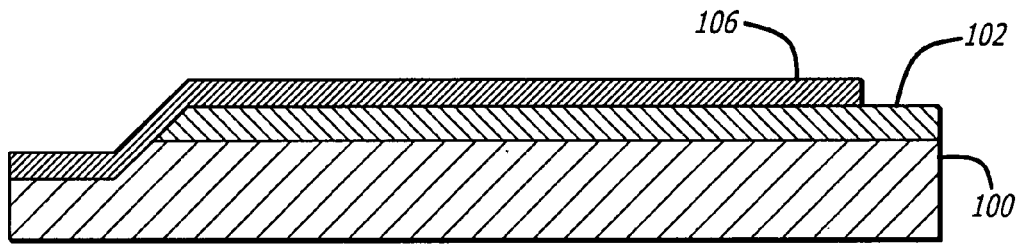

As shown in FIG. 4e, non-magnetic write-gap layer 106 is then formed on the backside shield 102 and main pole 100. The write-gap 106 can be formed with known sputtering processes.

A write shield layer is then formed on the write-gap layer 106 (not shown). With the described process the backside shield can be created without increasing the thickness of the write-gap layer or significantly altering the fabrication process of the head.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A head for a hard disk drive, comprising:
   a perpendicular recording head that includes;
   a magnetic main pole having a backside portion and a tapered portion, said magnetic main pole contains a write coil;
   a non-magnetic write-gap adjacent to said backside and tapered portions of said magnetic main pole;
   a non-magnetic backside shield located between said non-magnetic write-gap and said main pole on said backside portion; and,
   a write shield located adjacent to said non-magnetic write-gap.

2. The head of claim 1, wherein said non-magnetic backside shield includes aluminum oxide.

3. A hard disk drive, comprising:
   a base plate;
   a spindle motor coupled to said base plate;
   a disk coupled to said spindle motor;
   an actuator arm coupled to said base plate;
   a voice coil motor coupled to said actuator arm;
   a perpendicular recording head that is coupled to said actuator arm and said disk, and includes;
   a magnetic main pole having a backside portion and a tapered portion, said magnetic main pole contains a write coil;
   a non-magnetic write-gap adjacent to said backside and tapered portions of said magnetic main pole;
   a non-magnetic backside shield located between said non-magnetic write-gap and said main pole on said backside portion; and,
   a write shield located adjacent to said non-magnetic write-gap.

4. The disk drive of claim 3, wherein said non-magnetic backside shield includes aluminum oxide.

5. A process for forming a perpendicular recording head for hard disk drive, comprising:
   providing a main pole that includes a write coil;
   forming a non-magnetic backside shield layer on the main pole;
   removing portions of the non-magnetic backside shield layer and the main pole to create a taper portion in the main pole;
   forming a non-magnetic write-gap layer on the non-magnetic backside shield layer and the main pole; and,
   forming a write shield on the non-magnetic write gap layer.

6. The process of claim 5, wherein the non-magnetic backside shield layer includes aluminum oxide.

* * * * *